Figure 4:
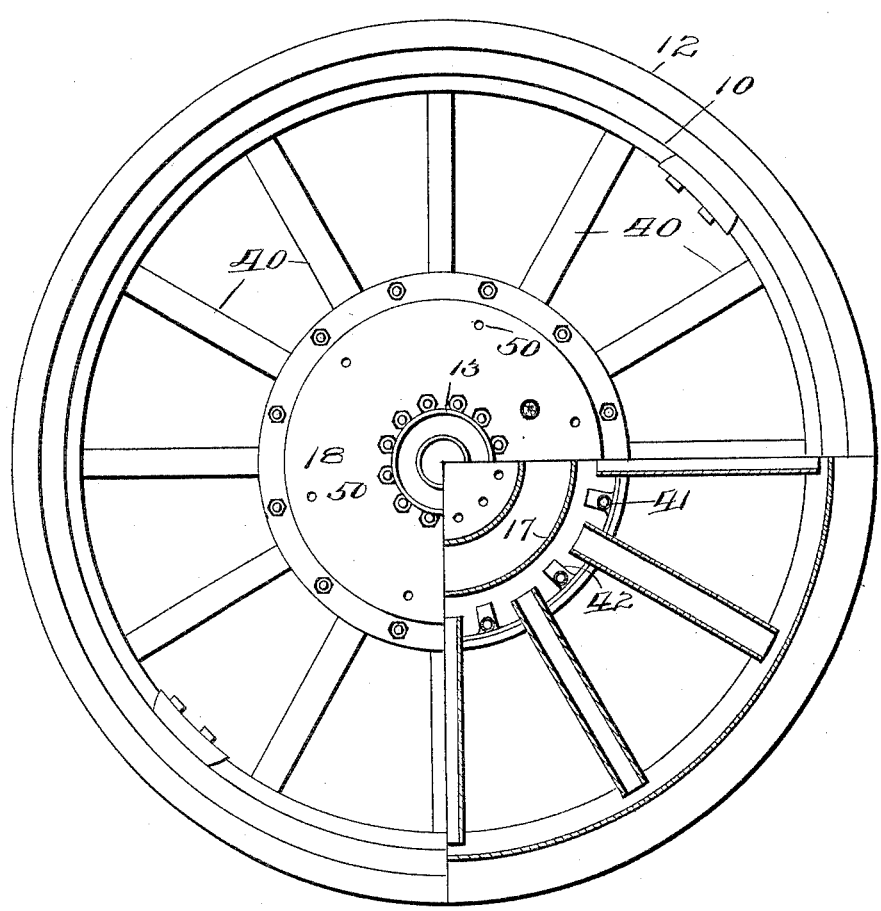

O. H. ATTRIDGE.
WHEEL FOR AUTOMOBILES AND OTHER VEHICLES.
APPLICATION FILED AUG. 22, 1912.
1,081,192.
Patented Dec. 9, 1913.
2 SHEETS—SHEET 1.
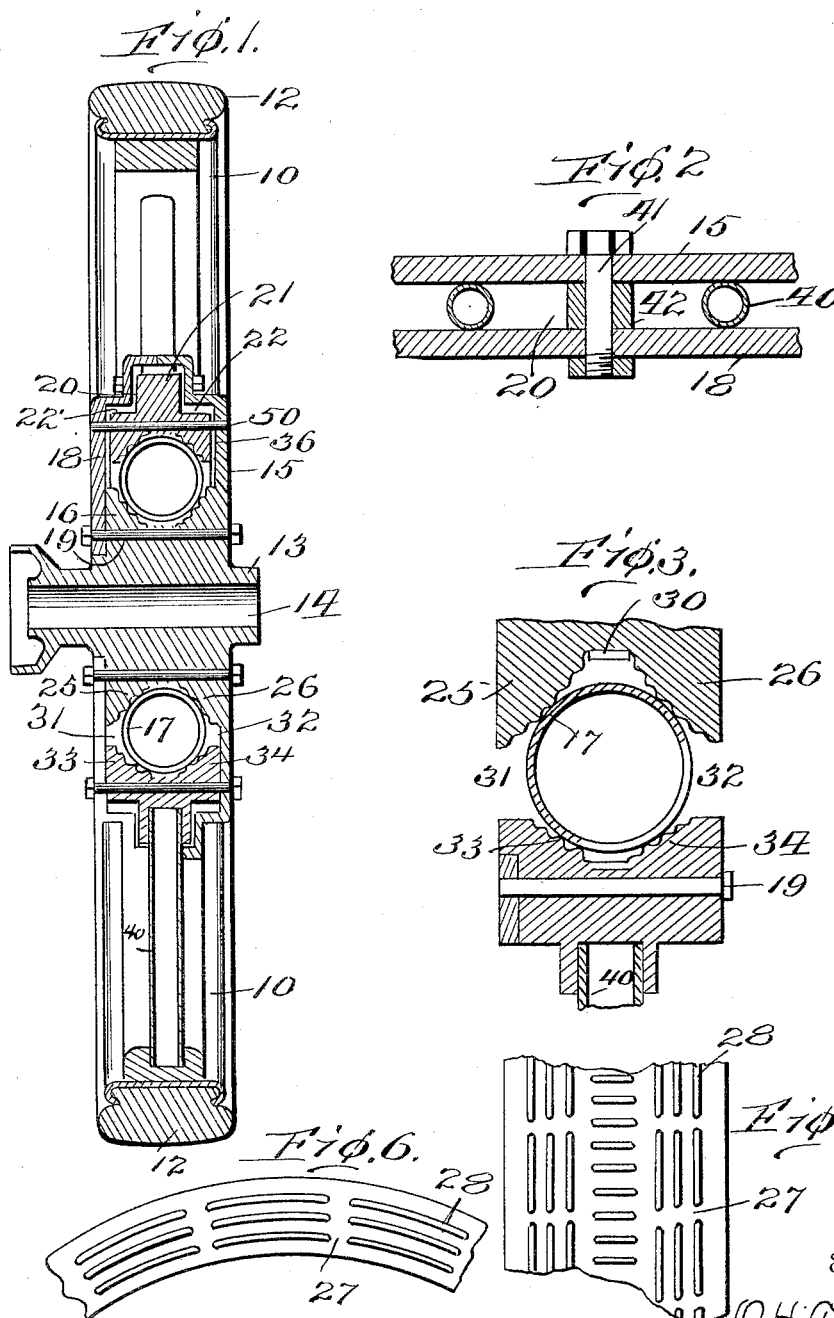

O. H. ATTRIDGE.
WHEEL FOR AUTOMOBILES AND OTHER VEHICLES.
APPLICATION FILED AUG. 22, 1912.

1,081,192.

Patented Dec. 9, 1913.
2 SHEETS—SHEET 2.

Witnesses

Inventor
O. H. Attridge
By
Beall & Fenwick
Attorneys

UNITED STATES PATENT OFFICE.

OLIVER H. ATTRIDGE, OF MONTGOMERY, ALABAMA, ASSIGNOR OF ONE-FOURTH TO WILLIAM N. COX, ONE-FOURTH TO CADWALDER W. BEALE, AND ONE-FOURTH TO FREDERICK G. BENNETT, ALL OF MONTGOMERY, ALABAMA.

WHEEL FOR AUTOMOBILES AND OTHER VEHICLES.

1,081,192.  Specification of Letters Patent.  Patented Dec. 9, 1913.

Application filed August 22, 1912. Serial No. 716,568.

*To all whom it may concern:*

Be it known that I, OLIVER H. ATTRIDGE, citizen of the United States, residing at Montgomery, in the county of Montgomery and State of Alabama, have invented certain new and useful Improvements in Wheels for Automobiles and other Vehicles, of which the following is a specification.

This invention relates to wheels for automobiles and other vehicles, and the object is to provide improved means for cushioning a wheel in order to provide for all necessary resiliency without the necessity of employing a pneumatic tire.

A further object is to provide improved means for mounting a resilient device such as a pneumatic tube within a casing surrounding a hub in order that shocks transmitted from the periphery of the wheel may be taken up within said wheel and not transmitted to the axle or to the vehicle.

A further object is to provide means for mounting a pneumatic tube in such manner that shocks transmitted thereto and absorbed thereby will not cause the creeping of the tube, or other motion of the tube, or other motion of any of the parts constituting the structure within which the tube is inclosed.

With these and other objects in view the invention consists in the improved and novel construction hereinafter described and claimed.

In the accompanying drawings, Figure 1 is a view of the wheel in vertical transverse section. Fig. 2 is a detail chiefly in section showing the elements of the housing surrounding the hub. Fig. 3 is a transverse section through the inner tube and the device immediately inclosing such tube. Fig. 4 is a view of the wheel in side elevation, with parts in vertical section, and Figs. 5 and 6 show details of construction.

In carrying out my invention, I employ a rim 10 of any suitable construction and mount therein a tire 12 which may be a solid tire, in view of the cushioning devices hereinafter described which are designed to take up all shocks which would otherwise be transmitted to the axle and to the vehicle.

The hub is indicated by 13 and is provided with the usual bore 14 for the reception of the vehicle axle. Tube 14 is provided with an upwardly extending flanged portion 15 which has the configuration shown, that is to say, the inner portion, near the point of connection of the flange to the hub is grooved and made to conform to the opposite portion indicated by 16. This construction permits of the location of the pneumatic tube 17 within the annular concave channel thus formed in the periphery of the hub.

A plate 18 is located upon the side of the hub opposite to portion 15 and is detachable, being secured by bolts 19. The outer portions of members 15 and 18 are flanged in the manner shown, in order to complete the housing for tube 17 and member 20 located within the housing and extending continuously about tube 17 device 20 having substantially ring formation. Ring member 20 is reduced at portion 21 or flanged in order to conform to the channel shape of the casing or housing at that point and normally a space is provided at 22 and 23.

The construction of the inner portion of ring member 20 is an important feature of my invention and will be described. Member 20 is provided with an annular channel or groove, within which tube 17, or the outer portion thereof, is received, and a plurality of jaw-like members are indicated respectively by the numbers 25 and 26, these members being grooved or corrugated circumferentially in the manner shown in Figs. 5 and 6, the groove terminating at suitable intervals in order to form transverse channels 27. It will be understood that the corrugations and transverse channels are somewhat shallow and are not sufficiently prominent to in any way injure the tube 17, but merely provide a reasonable amount of frictional contact in order to prevent creeping or other undesirable movement of the parts. The circumferential corrugations are indicated by 28. Portions 25 and 26 (although referred to as jaw-like members and are in reality such if a given segment of the ring member 20 is considered by itself), constitute, in fact, flanges for member 20. These flanges are made convex on their inner surface as shown in Fig. 3. The central portion of the groove between members 25 and 26 is provided with a series of transverse teeth 30 for further engaging tube 17 when the latter is under compression.

Air pockets 31 and 32 are provided on oppositely located tube-engaging devices. It may be stated here that the members 33 and 34 engaging that portion of tube 17 next to the axle may have the same configuration as the surface of members 25 and 26 but need not necessarily be thus formed. Communication is established between air spaces 31 and 32 by means of shallow grooves 36 extending at suitable intervals to the air spaces 22 and 22′ located on the opposite side of ring member 20. It is the intention that the several air spaces referred to on opposite sides of ring member 20 shall have a comparatively large capacity as compared with the small and shallow grooves 36, in order that the air may move somewhat slowly and provide the effect desired.

Referring to Figs. 2 and 4 the spokes are indicated by 40 and these spokes have their inner bearing in the outer portion of ring member 20 and between members 15 and 18 constituting the sides of the housing. Members 15 and 18 are connected by transversely arranged bolts 41 the latter being encircled by short sleeves 42 disposed between the plates for the purpose of properly spacing them. Slots 42′ provide sufficient play for these bolts and provide movement of the parts necessary to the proper operation of the cushioning device. In the event of the collapse of the pneumatic tube, the annular member 20 is supported by the parts of the housing by inserting bolts 50 at suitable intervals in order to properly secure member 20.

What I claim is:

1. In a device of the class described, a hub, a housing, connected therewith, a resilient device within the housing, annular means within said housing bearing upon the resilient device, said annular means being provided with a channel, the walls of which are formed to engage the surface of the resilient device, said walls having a series of circumferential grooves interrupted at intervals to form transverse channels and a series of transverse members at the deepest portion of the channel first mentioned and arranged to engage the tube when the latter is highly compressed.

2. In a device of the class described, a hub, a housing having an outer circumferential channel connected with the hub, a tubular member within the housing, an annular member surrounding the tubular member, said annular member having an outer central flanged portion entering the channel of the housing, the housing being provided with air chambers on the sides of the tube between the latter and the annular member, additional air chambers between the side air chambers and the aforesaid channel, means for connecting certain of the air chambers along the walls of the housing, the annular member being grooved circumferentially for engaging the tube and having a series of transverse members at the deepest portion of the groove with transverse channels between the transverse members, and annular channels interrupted at intervals on each side of the transverse members.

In testimony whereof I affix my signature in presence of two witnesses.

OLIVER H. ATTRIDGE.

Witnesses:
T. A. TOMS,
J. H. WALKER.

---

Copies of this patent may be obtained for five cents each, by addressing the "Commissioner of Patents, Washington, D. C."